(12) United States Patent
Jordil

(10) Patent No.: US 9,605,962 B2
(45) Date of Patent: Mar. 28, 2017

(54) INCLINATION SENSOR

(71) Applicant: HEXAGON TECHNOLOGY CENTER GMBH, Heerbrugg (CH)

(72) Inventor: Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 206 days.

(21) Appl. No.: 14/420,322

(22) PCT Filed: Aug. 7, 2013

(86) PCT No.: PCT/EP2013/066544
§ 371 (c)(1),
(2) Date: Feb. 6, 2015

(87) PCT Pub. No.: WO2014/023764
PCT Pub. Date: Feb. 13, 2014

(65) Prior Publication Data
US 2015/0219455 A1    Aug. 6, 2015

(30) Foreign Application Priority Data
Aug. 8, 2012 (EP) .................... 12179722

(51) Int. Cl.
*G01C 9/00* (2006.01)
*G01C 15/00* (2006.01)
*G01C 9/14* (2006.01)

(52) U.S. Cl.
CPC ............. *G01C 15/008* (2013.01); *G01C 9/00* (2013.01); *G01C 9/14* (2013.01); *G01C 15/00* (2013.01)

(58) Field of Classification Search
CPC ........ G01C 15/00; G01C 15/008; G01C 9/00; G01C 9/14
(Continued)

(56) References Cited

U.S. PATENT DOCUMENTS 4,549,277 A * 10/1985 Brunson .................. G01C 9/06
                                                                33/366.12
5,929,807 A    7/1999 Viney et al.
(Continued)

FOREIGN PATENT DOCUMENTS

CN    102419168 A    4/2012

OTHER PUBLICATIONS

European Search Report dated Dec. 14, 2012 as received in Application No. 12 17 9722.
(Continued)

*Primary Examiner* — Yaritza Guadalupe-McCall
(74) *Attorney, Agent, or Firm* — Maschoff Brennan

(57) ABSTRACT

Some embodiments of the invention relate to an inclination sensor for determining an inclination of an object with respect to a reference vector of a reference coordinate system. The inclination sensor may include a tilt detector for determining gravity vector data of a local gravity vector, and a calculation unit comprising means for providing, based on the position data, position-related vertical deflection data, the vertical deflection data comprising information about a relation between the local gravity vector and the reference vector, and calculation means for calculating reference vector data based on the vertical deflection data and on the gravity vector data, wherein an inclination of the object with respect to the reference vector is derivable from the reference vector data, to a surveying system comprising such an inclination sensor and to a method for determining the inclination of the object with respect to the reference vector.

21 Claims, 11 Drawing Sheets

(58) Field of Classification Search
USPC .................................................. 33/290, 228
See application file for complete search history.

(56) References Cited

U.S. PATENT DOCUMENTS

| | | |
|---|---|---|
| 2009/0024325 A1 | 1/2009 | Scherzinger |
| 2013/0091719 A1* | 4/2013 | Hohl ........................ G01B 5/24 33/534 |
| 2013/0326892 A1* | 12/2013 | Schorr ................ G01C 15/004 33/228 |
| 2014/0202012 A1* | 7/2014 | Vogel ..................... G01B 11/27 33/228 |
| 2015/0092183 A1* | 4/2015 | Dumoulin ............ G01C 15/004 356/4.07 |
| 2015/0219455 A1* | 8/2015 | Jordil ....................... G01C 9/00 33/228 |
| 2016/0216110 A1* | 7/2016 | Nishita .................... G01C 3/08 |

OTHER PUBLICATIONS

Dennis, M. L., "GPS, Geodesy, and the Ghost in the Machine", Workbook state edition, Version 8, Mar. 2010, pp. 1-82.
"USDOV2009", National Geodetic Survey, accessed at: http://www.ngs.noaa.gov/GEOID/USDOV2009/, accessed at Jan. 9, 2015, pp. 1-2.

* cited by examiner

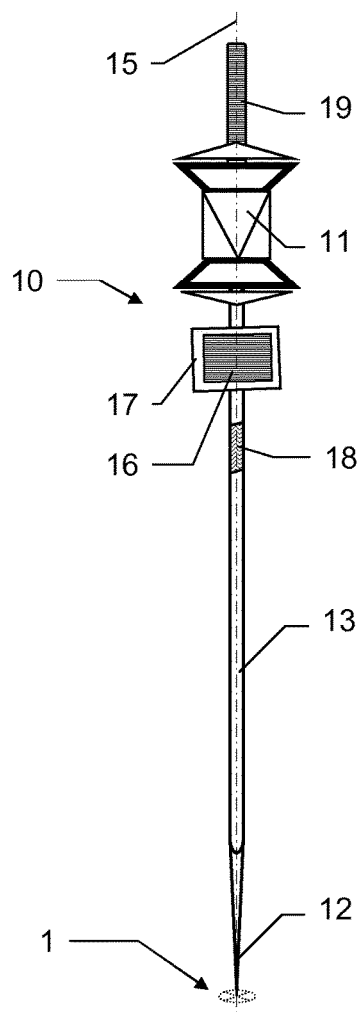
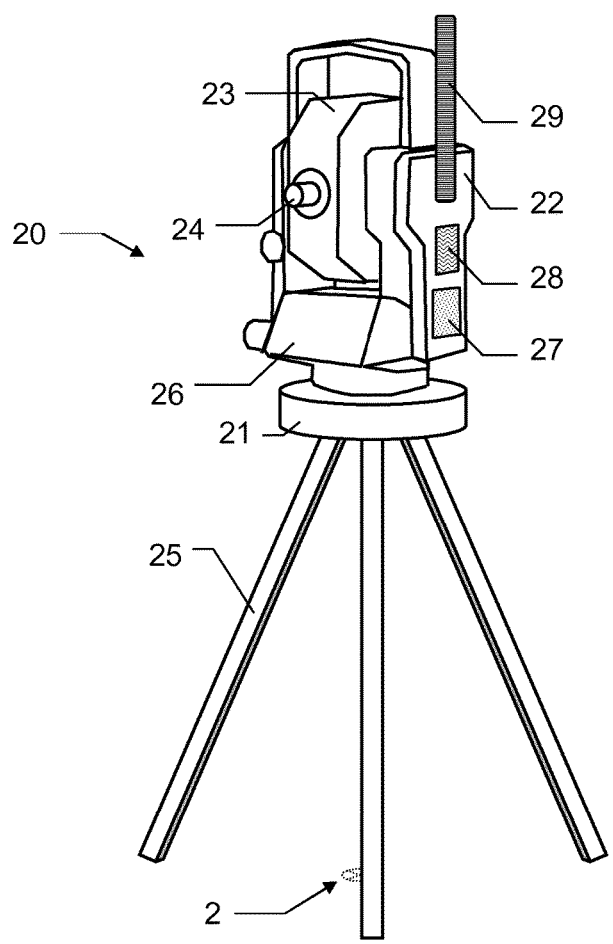
Fig. 2a
Fig. 2b

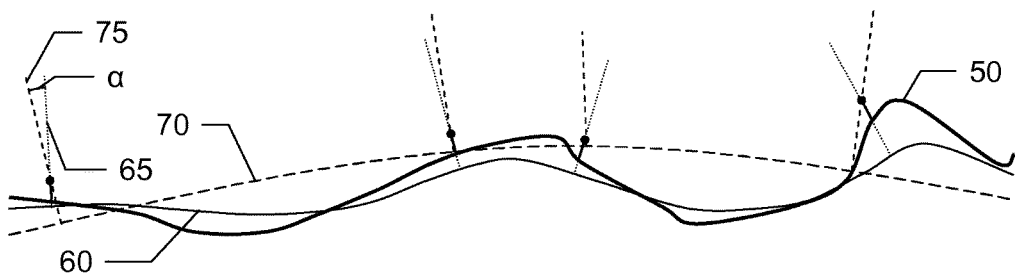
Fig. 5a
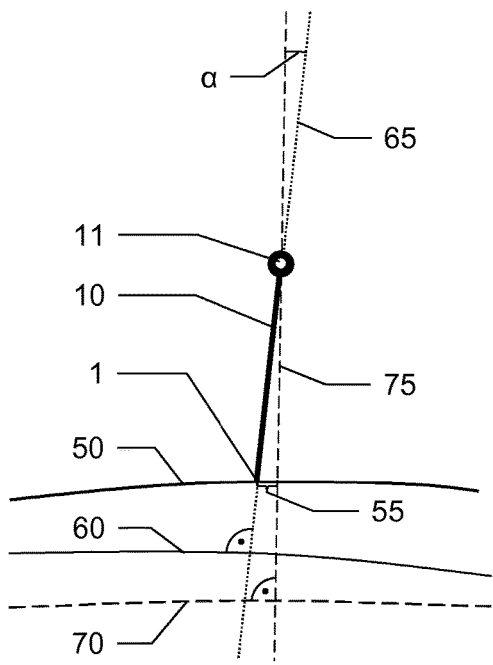 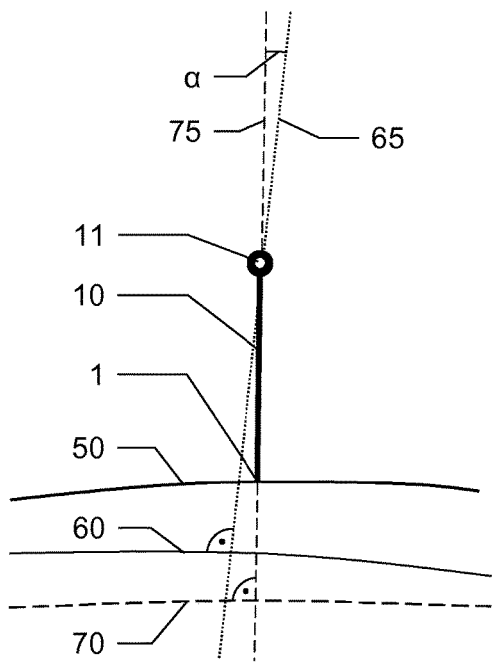
Fig. 5b　　　　　　　　　Fig. 5c

INCLINATION SENSOR

FIELD OF THE INVENTION

The present invention relates to an inclination sensor and a method for determining an inclination of an object with respect to a reference vector of a reference coordinate system, in particular for use with survey poles and geodetic surveying devices.

BACKGROUND

Many devices and instruments for geodetic or industrial measurement comprise tilt detectors for allowing an alignment with or an orientation relative to the direction of gravity.

There are many different kinds of tilt detectors known from prior art. For example, some are working with pendulums that are supported mechanically or electromagnetically, a position of which being detected by electronic, inductive, capacitive or optical means. Microelectronic mechanical systems (MEMS) typically use spring-mass systems that detect a displacement of a small test mass in dependence of the position. Other tilt detectors are based on liquids and use a reflection or refraction of a ray of light on the liquid level, a resistance measurement or capacitive measurements in dependence of the position of the liquid to determine a tilting angle.

As the Earth is neither perfectly spherical, nor of perfectly homogenous composition, nor motionless in space, the direction of the gravity vector of a point on the Earth almost nowhere exactly meets the centre of the Earth. Also, the gravitational acceleration differs from point to point.

At the Earth's surface the average gravitational acceleration accounts for approximately 9.81 m/s$^2$. This is an average value, as the Earth is not formed spherically but more like an ellipsoid of revolution, so that the poles are nearer to the Earth's centre than the equator. Moreover, the Earth rotates, so that the nearer a point of the Earth's surface is to the equator, the lower is the local gravity due to the centrifugal force; at the Earth's poles this effect is missing completely. Summed up, as a result of these two effects, on the Earth's surface gravity is by about 0.5% larger at the poles than at the equator. So, the gravitational acceleration is 9,832 m/s$^2$ at the poles and 9,745 m/s$^2$ at the equator.

Additionally, the inhomogeneous composition of the Earth's crust causes an inhomogeneous distribution of the direction and amount of gravity on the Earth's surface. For example, large masses of especially high density, such as nearby mountains or large ore deposits in the subsurface, can lead to local gravity anomalies. The measure of how far the direction of the local gravity field of a point on the Earth has been shifted by such local gravity anomalies is the "vertical deflection". This is the local difference between a local gravity vector, i.e. the true plumb line, and a reference vector, i.e. the line that would be perpendicular to the surface of a reference ellipsoid, e.g. chosen to approximate the Earth's sea-level surface.

For geodetic measurement purposes in which a point on the Earth's surface is to be measured with respect to a reference coordinate system, such as the mentioned reference ellipsoid, especially if high precision is required, vertical deflection can cause a serious problem, as tilt detectors of geodetic devices only detect the local plumb direction, i.e. the direction of the local gravity vector, and not the direction of a vector referenced to the reference coordinate system.

Geodetic survey poles, for instance, need to be placed on a point to be measured in such a way that a reflecting part is centred over the point. A user holds the survey pole in a vertical position on a point to be surveyed using a bubble level so that the retro-reflector is directly over the point to be surveyed. Unless the pole is perfectly upright with respect to the ground, the horizontal position of the reflector will be displaced compared to the location on the ground of interest.

Classically, also pitch and roll of the pole are observed through measurements of the local gravity vector which induce an acceleration measurement on the accelerometers.

A geodetic survey pole for use with a geodetic surveying device, such as a total station, and comprising a tilt detector and a position detection device, such as a GNSS antenna, for instance, is disclosed in the documents US 2009/0024325 A1 and U.S. Pat. No. 5,929,807.

Through entering known values for the local gravitational direction and/or acceleration in a device's setup, the vertical deflection effect could be at least partially compensated. Compensation software of the device then could automatically compensate the undesired effect by calculating corrected inclination values based on the entered gravity values or vertical deflection data. However, for this solution the gravity values or the vertical deflection data for the current location would have to be known to the user or at least be available to the user at the time of the measurement. Also, this method would be rather time-consuming and through input errors a consistent source for measuring errors. In a simpler solution, only the (approximate) latitude could be entered, thus however completely neglecting the effects of local anomalies.

SUMMARY

Some embodiments of the present invention provide an inclination sensor and a method for quickly, reliably and precisely determining an inclination of an object with respect to a reference vector of a reference coordinate system.

Some embodiments to provide such an inclination sensor and such a method for use with surveying equipment or systems, in particular with survey poles and/or geodetic surveying devices, such as total stations or theodolites.

Some embodiments of the invention provide a surveying system that permits the user to conveniently determine coordinates of a point with respect to a reference coordinate system.

According to the present invention, an inclination sensor comprises a tilt detector, localization means for determining the actual position of the tilt detector on the Earth's surface and a calculation unit having means for providing data and calculation means. The means for providing data preferably comprise storing means that are adapted for storing local and/or regional vertical deflection data, i.e. data about the gravitational acceleration and/or the direction of a gravity vector for certain points and/or regions on the Earth's surface. The calculation means are adapted for calculating reference vector data based on the vertical deflection data and on the gravity vector data. From the reference vector data an inclination of the object with respect to the reference vector is derivable. Based on the reference vector data, for instance, an inclination with respect to the reference vector data can be displayed to a user, coordinates of a measurement point can be determined or a device can be levelled with respect to a reference plane.

Determining the actual position of the tilt detector on the Earth's surface need not be of geodetic precision. For most applications it is sufficient to determine a rather "coarse" position with a precision of some meters or more. Preferably, the actual position determined by the localization means of the inclination sensor, therefore, at least has a 50% circular error probability (CEP) of less than 50 meters, in particular less than 20 meters, in order to be sufficiently precise for adequately taking local anomalies into consideration.

In a preferred embodiment of the invention the localization means are a Global Navigation Satellite System (GNSS) receiver, such as for instance the Leica Viva® GNSS GS 12 receiver. The satellite positioning system most commonly in use today is the Global Positioning System (GPS) although others are also in use or under development. Some land based systems which simulate satellite systems are also being developed. Alternatively or additionally, the localization means are adapted to determine a position by means of wireless telecommunication networks, such as wireless local area network (WLAN) connections or mobile phone connections. Alternatively or additionally, the localization means can be a referenced total station for determining a position of the tilt detector relative to the reference coordinate system.

In another preferred embodiment the means for providing data of the calculation unit comprise communication means, in particular a modem, for allowing data traffic to and from external storing means that are provided by a remote—public or access restricted—server. Thus, local and/or regional vertical deflection data can be downloaded from the server or uploaded to the server.

Preferably, the calculation unit comprise a selection algorithm for selecting for each determined position the most appropriate local or regional vertical deflection data out of the available set of data. Favourably, the selection algorithm is also adapted for calculating a mean value out of two or more pieces of position-related vertical deflection data. For instance if there is no data available for the actual position but for three similarly distant points in the proximity a vertical deflection at the actual position could be calculated or estimated from the spatial distribution of the available vertical deflection data.

In a preferred embodiment the inclination sensor additionally comprises a calibration functionality. This calibration functionality for instance works as a self-calibration with measurements in different angular positions or by comparing with external standards. Preferably, calibration values—linked to the position—can be stored in storing means of the calculation unit. Thus, the user is enabled to add position-related vertical deflection data to existing data-bases or create own data-bases. If external comparison standards are used also errors connected to the device can be compensated.

Preferably, the inclination sensor comprises means for determining, storing and uploading local vertical deflection data for later use with the same device, an identical or even a different device.

In a preferred embodiment the inclination sensor is adapted to automatically decide whether the available position-related vertical deflection data is sufficiently precise for the desired precision of the actual surveying purpose. If no sufficient data is available, a warning can be issued to the user, for instance telling the user to start a calibration procedure or to establish a connection to a remote server. Alternatively, a connection to the remote server can be established fully automatically for downloading sufficient data, and only if no connection is establishable or no sufficient data is available on the server a warning is issued.

The tilt detector can be of any type that outputs an electronic signal (local gravity vector data) that can be processed and interpreted by electronic calculation means; for instance, the tilt detector can be a liquid-level sensor, bubble sensor or an MEMS sensor.

Beside its already mentioned use in geodetic equipment and applications, the inclination sensor according to the invention can be used in a wide range of different devices that are to be referenced to a reference ellipsoid and where high precision is desirable. These can for instance be self-levelling laser measurement devices, such as accurate point and line lasers, grade lasers or pipe lasers. Also hand-held probes or machine control sensors for use with laser trackers can be equipped with an inclination sensor according to the invention. Examples for such devices are T-Mac®, T-Probe® and T-Scan® from Leica Geosystems®.

BRIEF DESCRIPTION OF THE DRAWINGS

The invention in the following will be described in detail by referring to exemplary embodiments that are accompanied by figures, in which:

FIG. 2a shows a survey pole as a first exemplary embodiment of an object with an inclination sensor according to the invention;

FIG. 2b shows a total station as a second exemplary embodiment of an object with an inclination sensor according to the invention;

FIG. 5a illustrates deviations of the geoid from the ellipsoid that lead to local gravitational anomalies;

FIG. 5b schematically shows a survey pole being aligned with the local gravity vector;

FIG. 5c schematically shows a survey pole being aligned with a reference vector of the reference coordinate system;

DETAILED DESCRIPTION

Figure 1A:
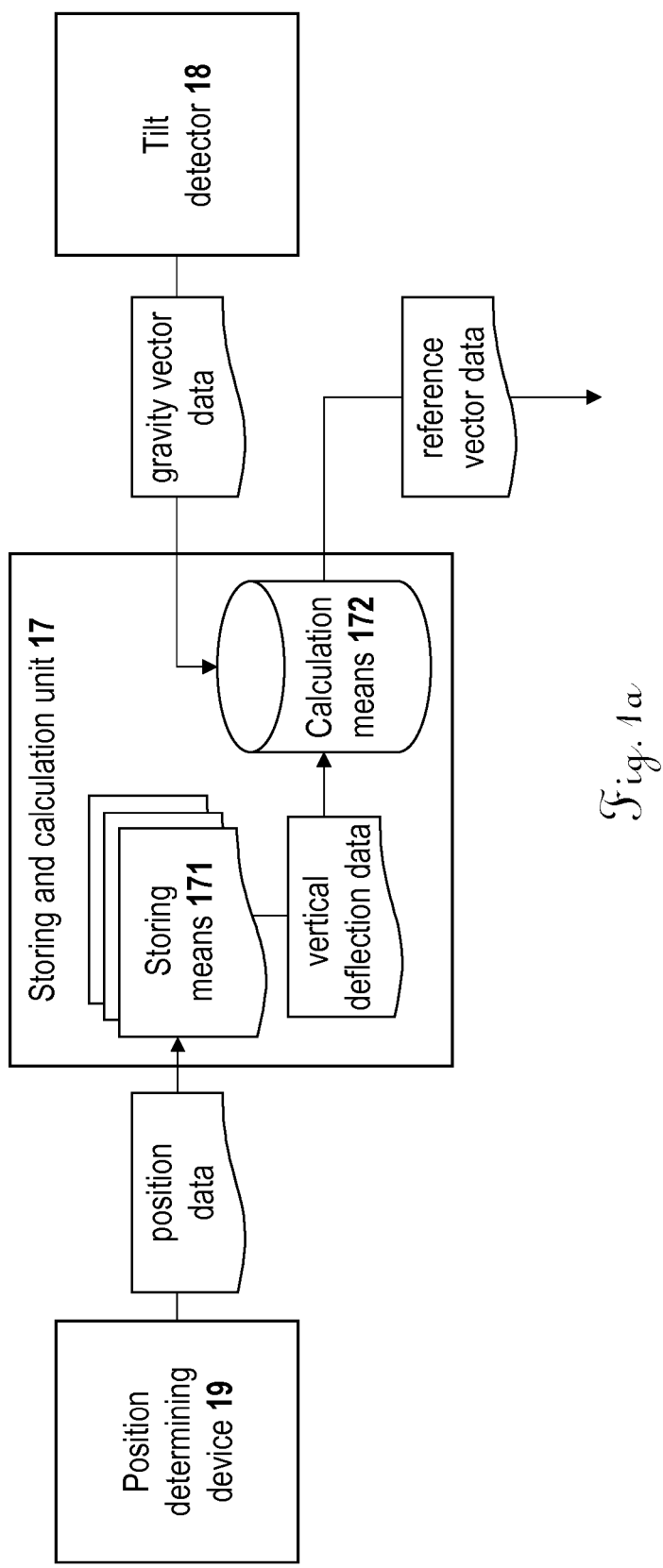
FIG. 1a schematically shows the configuration of a first embodiment of an inclination sensor according to the invention.
Figure 1B:
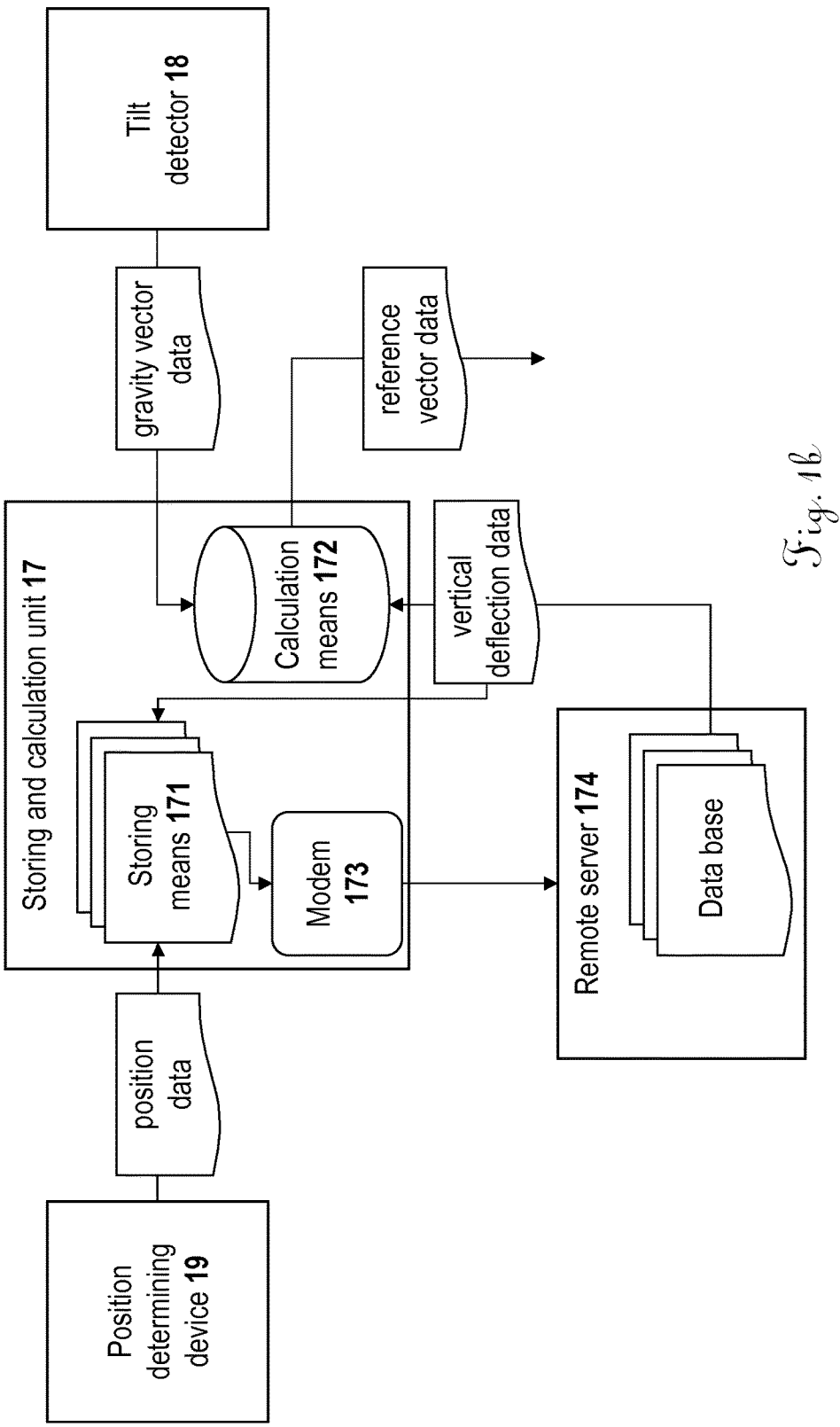
FIG. 1b schematically shows the configuration of a second embodiment of an inclination sensor according to the invention.

In FIGS. 1a and 1b schematically the configurations of two exemplary embodiments of an inclination sensor according to the invention are depicted. In both embodiments the inclination sensor comprises a calculation unit 17 with means for providing data and calculation means 172, a tilt detector 18 and a position determination device 19, and in both embodiments the tilt detector 18 determines local gravity vector data, in particular comprising an inclination with respect to a local gravity vector. The gravity vector data is sent to the calculation means 172 of the calculation unit 17. The position determination device 19 detects at least a course position of the inclination sensor.

FIG. 1a schematically shows a first embodiment of the inclination sensor. In this embodiment the calculation unit 17 comprises local storing means 171. According to position data generated by the position determination device 19 the storing means 171 select appropriate local vertical deflection data from a set of stored vertical deflection data. This data is sent to the calculation means 172. Based on the local vertical deflection data and on the local gravity vector data the calculation means 172 calculate reference vector data.

In the second embodiment of the inclination sensor, being schematically depicted in FIG. 1b, the calculation unit 17 additionally comprises modem means 173 for establishing a data connection with a remote server 174 by means of an internet connection. The position data generated by the position determination device 19 is sent to a data base of the remote server. Appropriate local or regional vertical deflection data is selected from a set of available data according to the position data and sent back to the calculation unit 17. Based on the local vertical deflection data and on the local gravity vector data the calculation means 172 calculate reference vector data. Optionally, the received vertical deflection data can be stored in the storing means 171.

In both embodiments, the calculated reference vector data then is provided as output, so that based on the reference vector data, for instance, an inclination with respect to the reference vector data can be displayed to a user, coordinates of a measurement point can be determined or a device can be levelled with respect to a reference plane.

FIG. 2a shows a survey pole 10 as a first example for an object being equipped with an inclination sensor according to the invention. The survey pole 10 has a rigid, rod-shaped body 13 with a pointed tip 12 for contacting a measuring point 1 on the ground. The pole 10 comprises retro-reflector means 11 that are positioned on the body 13 at a known position relative to the tip 12. The body 13 defines a pole axis 15.

The depicted survey pole 10 comprises as components of the inclination sensor according to the invention a tilt detector 18 for the detection of a tilt of the pole axis 15 with respect to a local gravity vector and for the provision of gravity vector data, a GNSS receiver, in particular a GPS-antenna, as position determination device 19 for detecting a current position of the surveying pole 10, and a calculation unit 17 having display and controlling means 16.

FIG. 2b shows a total station 20 as a second example for an object being equipped with an inclination sensor according to the invention. The depicted exemplary total station 20 is adapted for measuring horizontal and vertical angles and distances to a remote target object.

The total station 20 is provided on a tripod 25, a base 21 of the total station 20 being directly fixed on the tripod 25. The main part of the total station 20 is rotatable relative to the base 21. The main part comprises a support 22, in this exemplary embodiment being formed by two columns. Between the columns a telescope unit 23 is supported tiltably around the horizontal axis. Furthermore, the main part comprises display and controlling means 26 which can be suitable in a known manner for controlling the total station 20 and for processing, displaying and storing measurement data.

The telescope unit 23 is arranged on the support 22 tiltably around a horizontal axis and thus can be rotated horizontally and vertically with respect to the base 21. Motor means (not shown) are provided for performing the required tilting movements for the alignment of the telescope unit 23.

The telescope unit 23 can be built as a component unit, wherein an optical system, a coaxial camera sensor, an eyepiece 24 and a graphics processor are integrated in a common telescope unit housing. The telescope unit 23 can be aimed at a target object so that the distance from the total station 20 to the target object can be detected by means of electronic sensors. Furthermore, electronic sensor means (not shown) are provided for detecting an angular orientation of the main part relative to the base 21 and of the telescope unit 23 relative to the support 22. The data are sent to the display and controlling means 26 and processed so that the position of the target point relative to the total station 20 is detectable, displayable and storable by the display and controlling means 26.

The support 22 comprises the components of the inclination sensor according to the invention: a tilt detector 28 for the detection of a tilt of the total station 20 with respect to a local gravity vector and for the provision of gravity vector data, a GPS-antenna as position determination device 29 for detecting a current position of the total station 20, and a calculation unit 27.

Figures 3A, 3B:
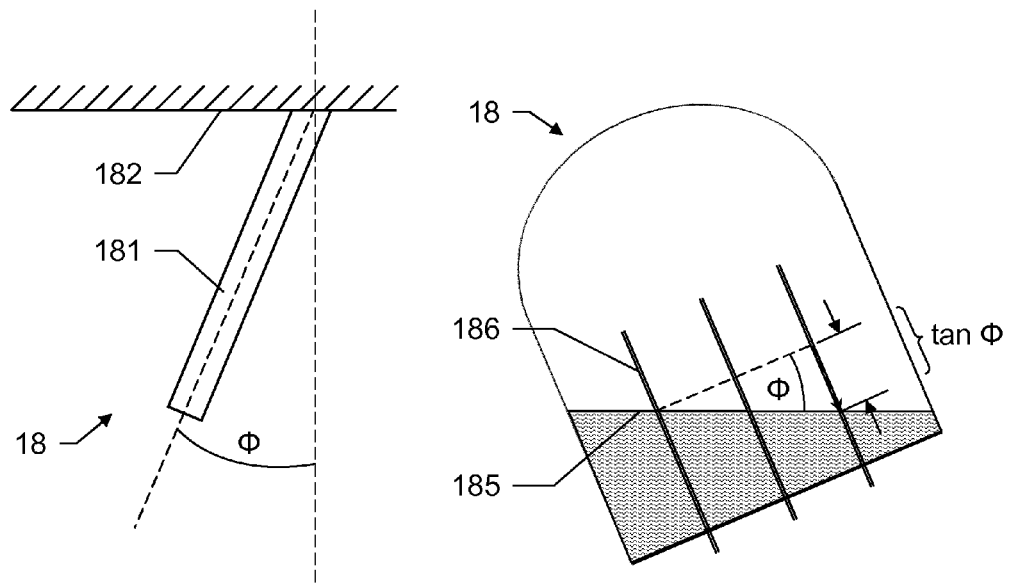
FIG. 3a shows a first exemplary tilt detector for use in the inclination sensor according to the invention.
FIG. 3b shows a second exemplary tilt detector for use in the inclination sensor according to the invention.

In FIGS. 3a and 3b two exemplary tilt detectors 18 are depicted that can be used with the inclination sensor according to the invention. FIG. 3a shows an MEMS tilt detector 18 having a body 181 suspended from a base 182. This tilt detector 18 works according to the following equation:

$$V_{out} = \text{bias} + (\text{scale factor} \times \text{acceleration})$$

Where the acceleration [g] is the Earth acceleration (1 g) applied through the sensitive axis, the bias [V] is the output voltage at 0 g acceleration, and the scale factor [V/g] is the sensor sensitivity.

The angle Φ is calculated with the following equation:

$$\Phi = \arcsin \frac{V_{out} - \text{bias}}{1 \text{ g} \times \text{scale factor}}$$

This equation shows that the measured angle directly depends on the local field of gravity. The larger the tilt, the larger is the effect on the measured angle.

The body 181 of the depicted tilt detector 18 is influenced by gravity, which is divided into elongation and deflection. Whereas elongation does not have any perceivable effect due to the rigidity of the material of the body 181, deflection is of relevance here. Deflection is calculated with the following equation:

$$D = m \times g \times \sin \Phi$$

Where m is the mass of the body, g is the Earth acceleration and tilting angle. Actually, deflection counteracts the spring constant, and the movement is $$s = \frac{D}{k} = \frac{m \times g \times \sin \Phi}{k}$$

This equation applies to all micromechanical sensors having a flexible region characterized by a spring constant.

FIG. 3b shows a liquid tilt detector 18. In this kind of tilt detectors a liquid level 185 remains in the horizontal because of the effect of gravitation. An angle Φ between the liquid level 185 and reference elements 186 is determined, for instance by detecting the distance tan Φ. Here, three electrodes serve as reference elements 186.

Figure 4:
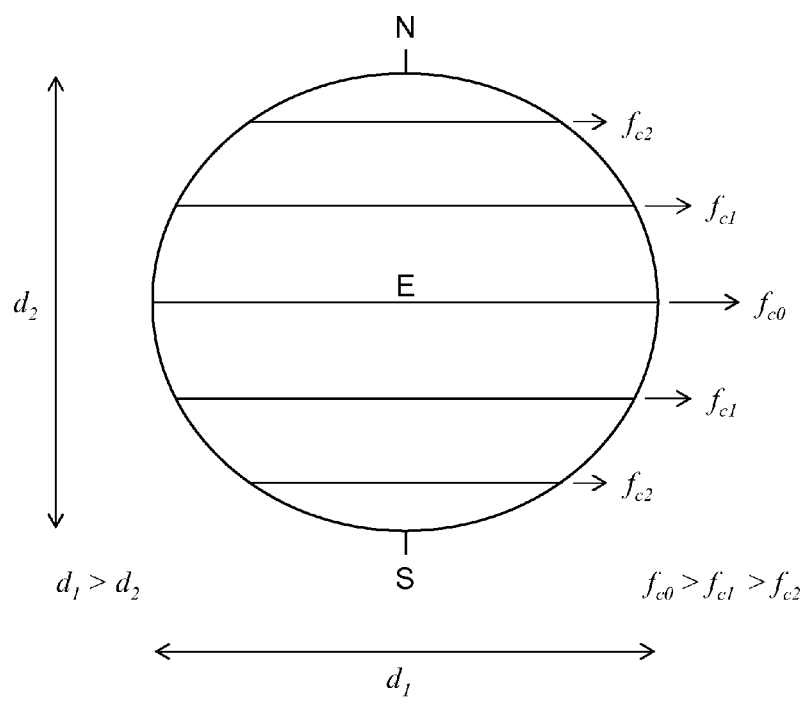
FIG. 4 illustrates properties of the Earth that lead to a general unequal distribution of gravitational acceleration depending on the latitude.

In FIG. 4 two properties of the Earth are illustrated that lead to the general unequal distribution of the gravitational acceleration depending on the latitude.

First, the Earth is not shaped spherically, but approximately has the shape of an ellipsoid of rotation: its diameter $d_1$ at the poles N,S is smaller than its diameter $d_2$ at the equator E. Therefore, gravitation is larger at the poles N,S than at the equator E.

Second, the Earth rotates around an axis going through the poles N,S. Therefore, centrifugal forces $f_{C0}$-$f_{C2}$ counteract the gravitational forces. This effect adds to the general unequal distribution of gravity on the Earth's surface, as the highest centrifugal forces $f_{C0}$ act at the equator E. The forces diminish towards the North Pole N and the South Pole S, so that the centrifugal forces $f_{C0}$ at the equator E are stronger than the forces $f_{C1}$ at the tropics, and those forces $f_{C1}$ are stronger than the forces $f_{C2}$ at the polar circles. Directly at the poles N,S centrifugal forces are not existent at all.

In addition of the two properties, gravitation in general depends on the latitude and is larger at the poles N,S than at the equator E.

FIG. 5a illustrates deviations of the geoid 60 from the ellipsoid 70 that add a local unequal distribution of gravitational acceleration to the general unequal distribution. Not only the strength but also the direction of the gravity diverges, so that respective influences are detectable at least for highly precise measurements, e.g. with nearby metalliferous deposits or in valleys surrounded by mountains.

A part of the Earth's surface is shown in a cross-sectional view. The ground 50 is represented by the bold line, the thin line represents the geoid 60 and the broken line represents a reference ellipsoid 70. Four survey poles are shown, located at different positions on the ground 50, their pole axes being aligned with the local gravity vectors 65, which is orthogonal to the geoid 60. A reference vector 75, being orthogonal to the reference ellipsoid 70 is also shown. The deviation between the local gravity vector 65 and the reference vector 75 is the vertical deflection angle α.

In FIGS. 5b and 5c a detailed view of a survey pole 10 of FIG. 5a is shown. FIG. 5b shows the survey pole 10 being aligned with the local gravity vector 65. Because of the vertical deflection the pole 10 is inclined with respect to the reference vector 75 of the reference coordinate system. Therefore, there is a deviation 55 between the detected position of the measurement point 1 on the ground 50 and its true position. In FIG. 5c the survey pole 10 is aligned with the reference vector 75 being orthogonal to the reference ellipsoid 70. The position of the measurement point 1 in the reference coordinate system thus can be detected without deviations because of vertical deflection.

Figure 6A:
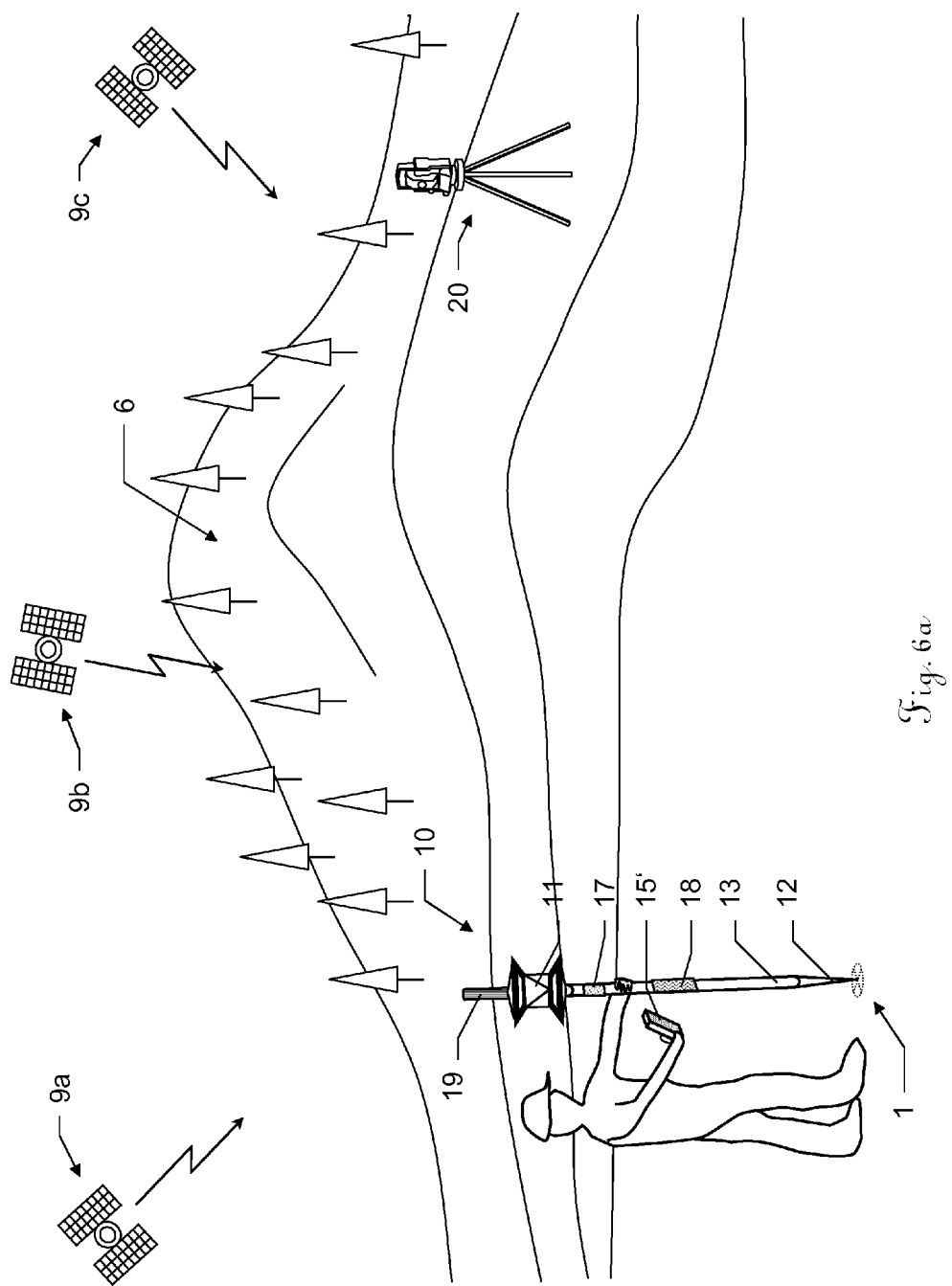
FIG. 6a shows a geodetic surveying situation with a positioning of a survey pole by means of a GNSS.
Figure 6B:
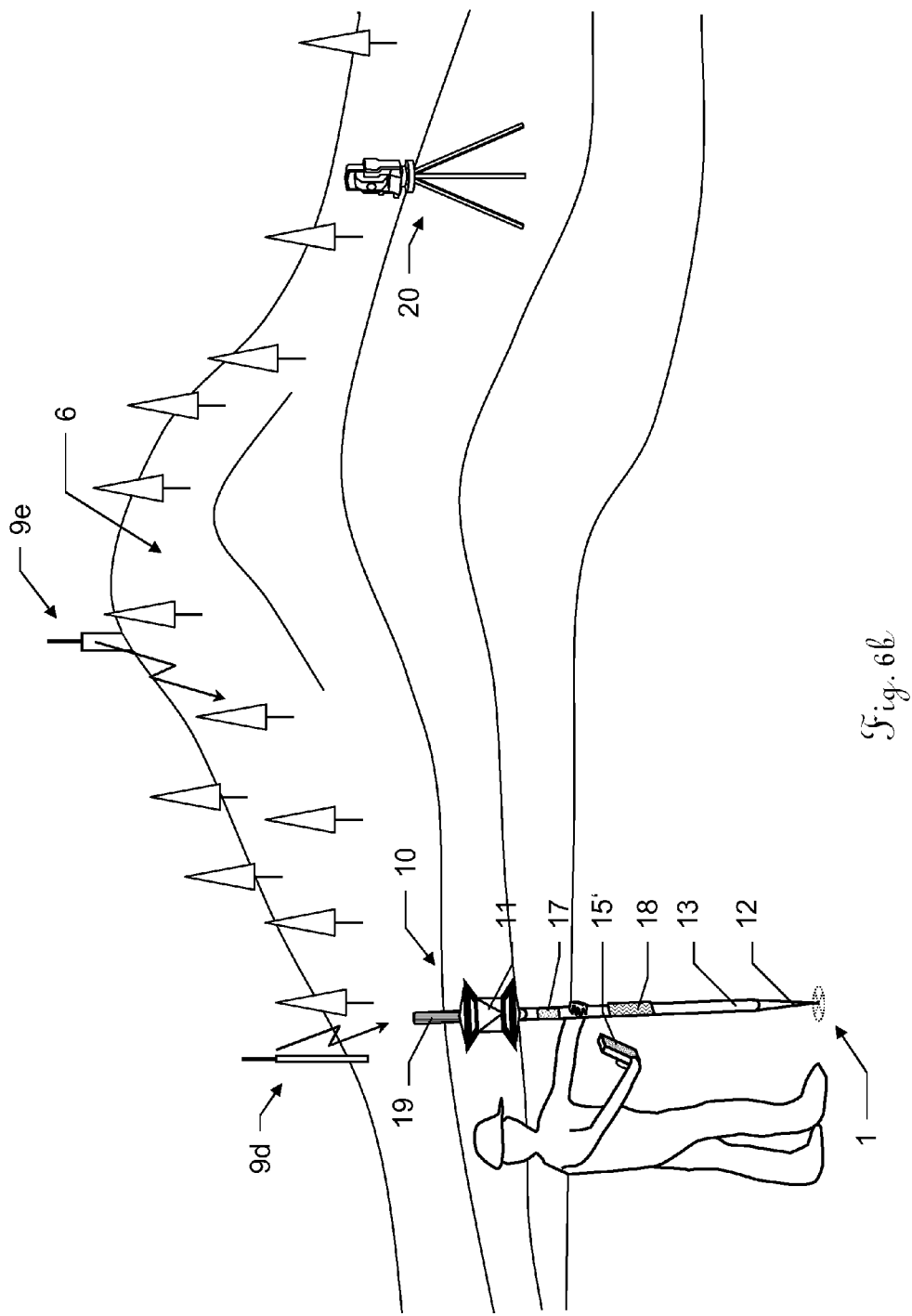
FIG. 6b shows a geodetic surveying situation with a positioning of a survey pole by means of radio triangulation.

In FIGS. 6a and 6b a typical geodetic surveying situation with a total station 20 and a survey pole 10 is illustrated, the survey pole 10 having an inclination sensor according to the invention. Coordinates of the measurement point 1 are to be determined within a reference coordinate system. A nearby mountain 6 generates a local gravity anomaly, so that from the latitude alone the vertical deflection cannot be deduced with considerable precision.

The survey pole 10 (also depicted in FIG. 2a) comprises a rigid, rod-shaped body 13 having a pointed tip 12 for contacting a measuring point 1 on the ground, the body 13 defining a pole axis 15. Retro-reflector means 11 are positioned on the body 13 at a known position relative to the tip 12. The survey pole 10 furthermore comprises a tilt detector 18 for detecting an inclination of the pole axis 15 with respect to a local gravity vector 65, a position determination device 19 for detecting a position of the survey pole 10 and calculation unit 17. A hand-held display and controlling device 16' is held by a user operating the pole 10.

The total station 20 is specified in detail in FIG. 2b. Its telescope unit is adapted for measuring a distance to the retro-reflector means 11 of the tilt pole 10. For the application described in FIGS. 6a and 6b a position determination device 29 of the total station 20 is only optional. The total station 20 is positioned over a reference point 2, the position of which is known with respect to the reference coordinate system.

The user positions the tip 12 of the survey pole 10 on a measurement point 1, the position of which is to be determined in a reference coordinate system. The tilt detector 18 detects a tilt of the pole axis with respect to the local gravity vector. Gravity vector data, in particular comprising an angle between the pole axis and the local gravity vector, is displayed to the user. In parallel, the position determination device 19 determines a position of the survey pole 10. In FIG. 6a this locating of the survey pole 10 is realized by means of a GNSS with satellites 9a-c, in FIG. 6b the positioning of the survey pole 10 is done by means of radio triangulation with radio masts 9d-e.

The position determination device 19 sends position data to the means for providing data of the calculation unit 17. The means for providing data comprise storing means 171 that are adapted for storing a set of position-related vertical deflection data and for providing vertical deflection data out of the stored set according to the position data. The storing means 171 provide vertical deflection data corresponding to the position data, i.e. data comprising information about the vertical deflection at the current position of the survey pole 10. The calculation means 172 calculate reference vector data based on the actual gravity vector data detected by the tilt detector and on the vertical deflection data. The reference vector data is displayed to the user. The user thus is enabled to align the pole axis with the reference vector. Then the total station 20 measures the distance and direction to the retro-reflector 11, which is positioned at a known position relative to the measurement point 1, so that a position of the measurement point 1 in the reference coordinate system is derivable.

Figure 8:
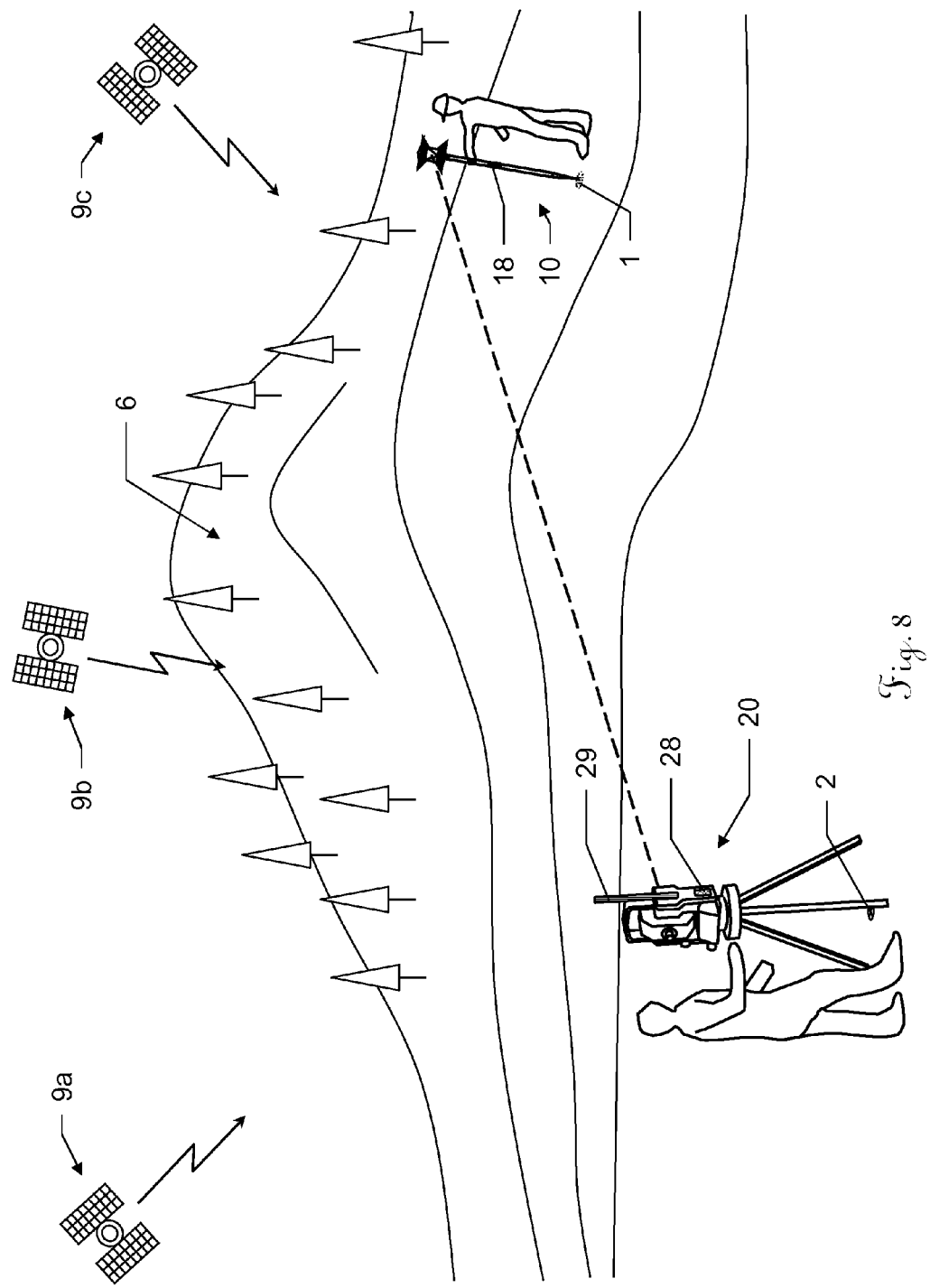
FIG. 8 shows a geodetic surveying situation with a positioning of a total station by means of a GNSS.

The position determination device and the calculation unit do not necessarily have to be integrated into the survey pole 10. If a position of the total station 20 is known, it can serve as position detector for the pole 10. This is shown in FIG. 8.

Figure 7A:
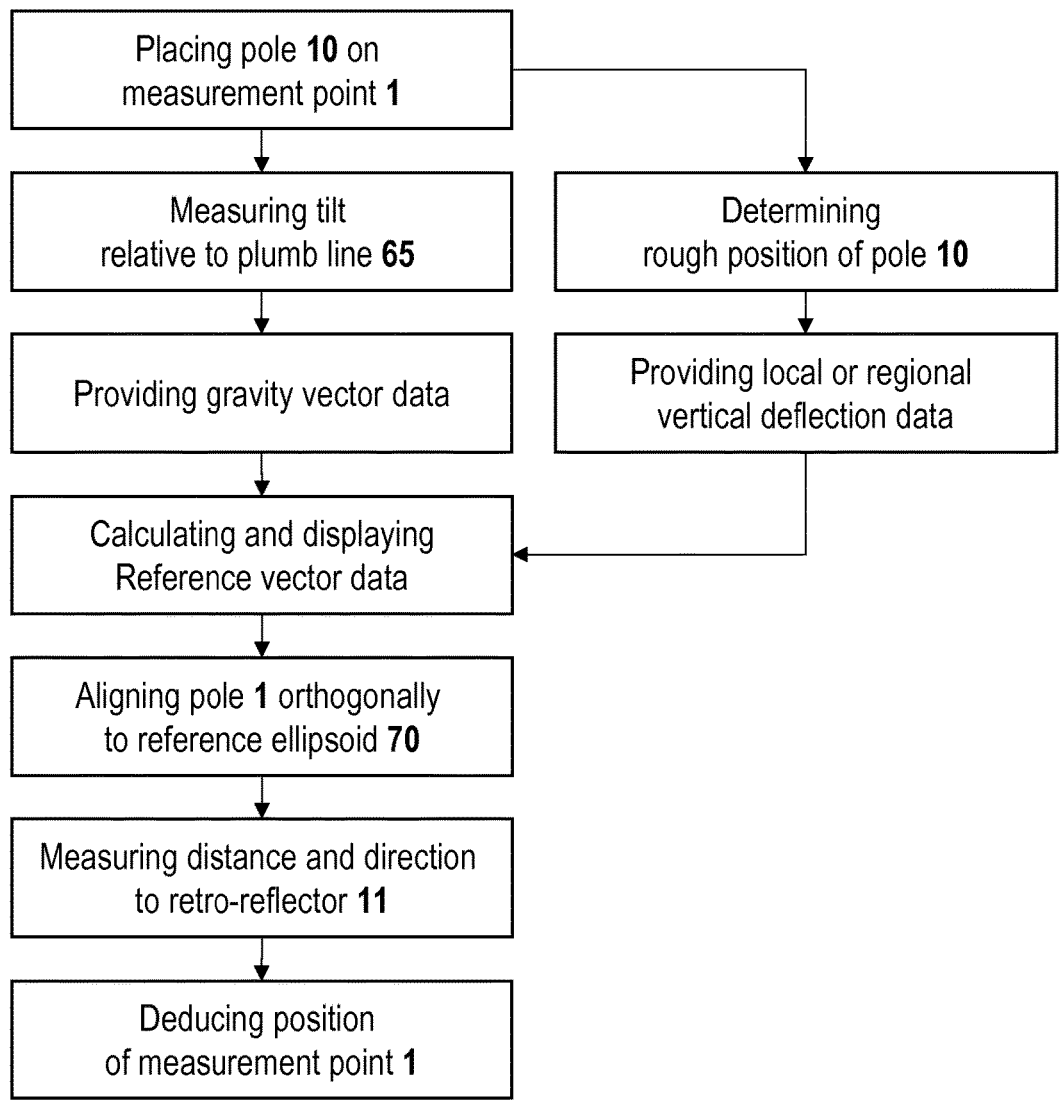
FIG. 7a is a flow chart illustrating a first method according to the invention for determining the position of a point relative to a reference coordinate system.
Figure 7B:
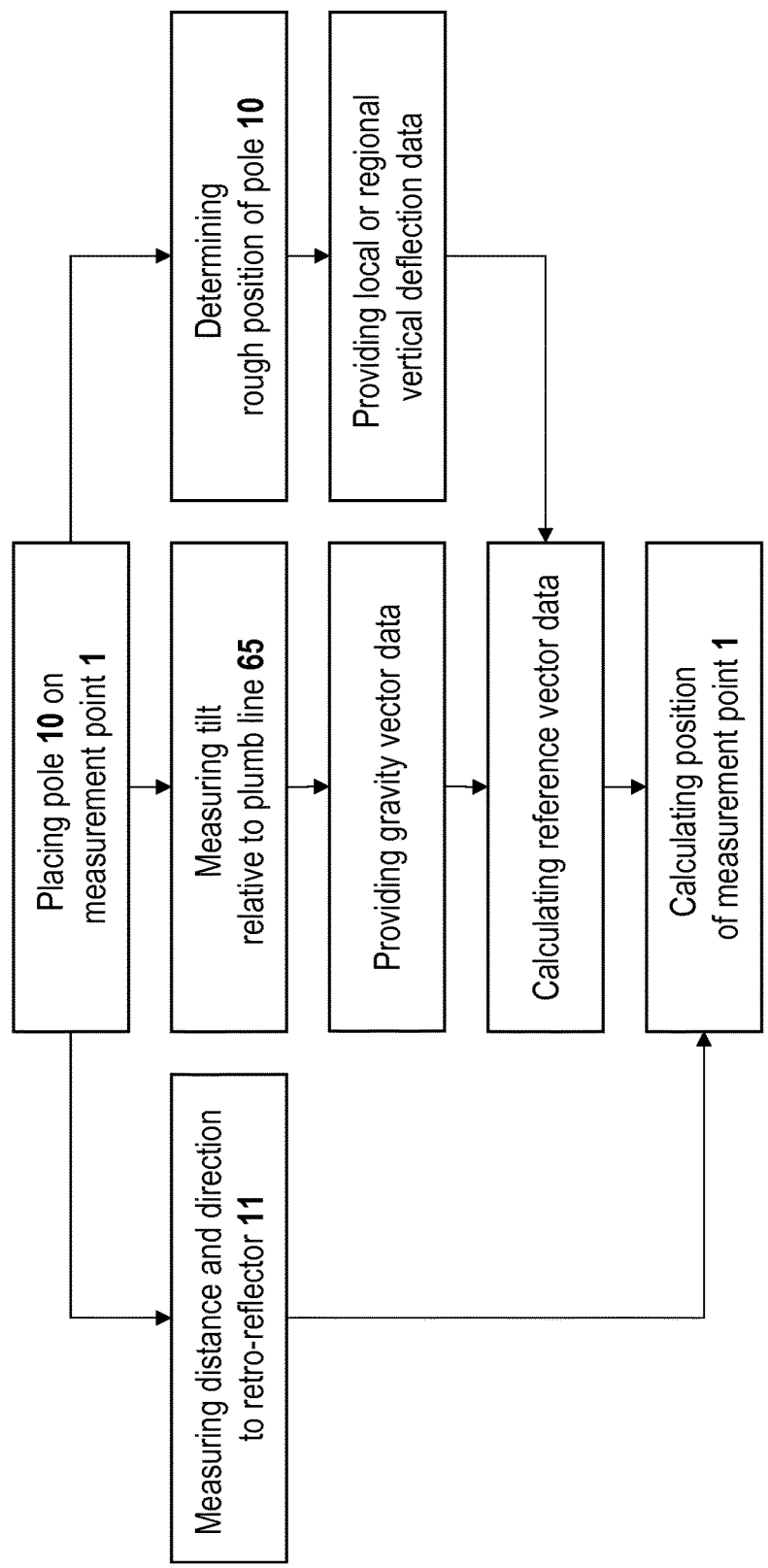
FIG. 7b is a flow chart illustrating a second method according to the invention for determining the position of a point relative to a reference coordinate system.

In FIGS. 7a and 7b two flow diagrams illustrate a first and a second method for determining the position of a point relative to a reference coordinate system with a survey pole having an inclination sensor according to the invention.

The first method, illustrated in FIG. 7a, starts with placing the survey pole 10 on the measurement point 1. Then, basically concurrently, a tilt relative to the plumb line is detected and a (at least coarse) position of the pole 10 is determined. Gravity vector data based on the measured tilt and vertical deflection data for the determined position of the pole 10 are provided. The method then comprises calculating reference vector data based on the gravity vector data and the vertical deflection data and—using the reference vector data—aligning the pole 10 orthogonally to the reference ellipsoid 70. Measuring the distance and direction to the retro-reflector 11 of the pole 10 allows deducing a position of the measurement point 1 in the reference coordinate system.

In the second method, illustrated in FIG. 7b, the distance and direction to the retro-reflector 11 of the pole 10 are measured after placing the survey pole 10 on the measurement point 1. The reference vector data is determined as described for the first method. But instead of displaying the data to a user, so that the pole can be aligned, the reference vector data is transmitted to the surveying device, where the position of the measurement point 1 is calculated based on the measured distance and direction to the retro-reflector 11 and the reference vector data at the survey pole 10. The survey pole 10 this way does not have to be aligned with the local gravity vector 65. This reduces measurement errors and allows untrained users to operate the survey pole 10.

In FIG. 8 a typical geodetic surveying situation with a total station 20 and a survey pole 10 is illustrated, the total station 20 and the survey pole 10, components of an inclination sensor according to the invention being distributed on the total station 20 and the survey pole 10. Coordinates of the measurement point 1 are to be determined within a reference coordinate system. A nearby mountain 6 generates a local gravity anomaly, so that from the latitude alone the vertical deflection cannot be deduced with considerate precision.

The total station 20 comprises a GPS antenna as a position determination device 29. The positioning of the total station 20 is carried out automatically by means of a GNSS with satellites 9a-c. Then a position of the survey pole 10 relative to the known position of the total station 20 is determined by means of the telescope unit 23 of the total station 20 and the retro-reflector means 11 of the survey pole 10.

Preferably, also the calculation unit 27 can be integrated into the total station 20. When the survey pole 10 is aligned with the local gravity vector 65, the calculation unit 27 can automatically correct the measured distance and direction to the pole 10 based on the vertical deflection data according to the detected position of the pole 10.

Alternatively, the survey pole 10 can comprise transmitter means for sending inclination data from the tilt detector 18 to receiver means of the total station 20. The survey pole this way does not have to be aligned with the local gravity vector 65. This reduces measurement errors and allows untrained users to operate the survey pole 10.

Figure 9:
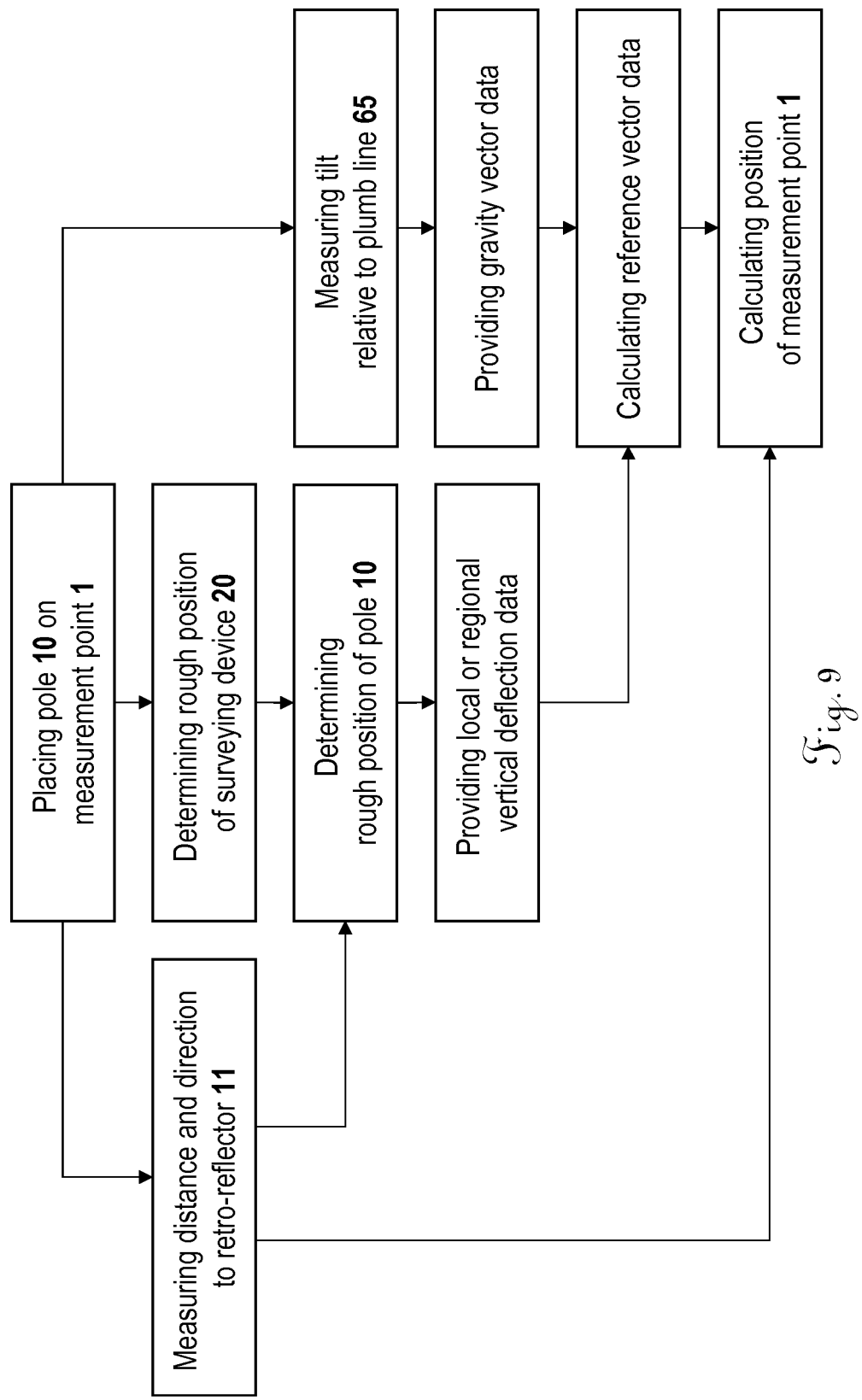
FIG. 9 is a flow chart illustrating a third method according to the invention for determining the position of a point relative to a reference coordinate system.

FIG. 9 shows a flow diagram illustrating a third method for determining the position of a point relative to a reference coordinate system with a survey pole 10 and a total station 20, the total station 20 having an inclination sensor according to the invention.

The third method starts with placing the survey pole 10 on the measurement point 1. Then, basically concurrently, a distance and direction is measured from a surveying device 20 to the retro-reflector 11 of the pole 10 and a (at least coarse) position of the surveying device 20 is determined. Next, also basically concurrently, a tilt of the pole 10 relative to the plumb line is detected and a (at least coarse) position of the pole 10 is determined based on the determined position of the surveying device 20 and the measured distance and direction. Gravity vector data based on the measured tilt and vertical deflection data for the determined position of the pole 10 are provided. The method then comprises calculating reference vector data based on the gravity vector data and the vertical deflection data. The reference vector data is transmitted to the surveying device 20, where the position of the measurement point 1 is calculated based on the measured distance and direction to the retro-reflector 11 and the reference vector data at the survey pole 10. The survey pole 10 this way does not have to be aligned with the local gravity vector 65. This reduces measurement errors and allows untrained users to operate the survey pole 10.

Although the invention is illustrated above, partly with reference to some preferred embodiments, it must be understood that numerous modifications and combinations of different features of the embodiments can be made. All of these modifications lie within the scope of the appended claims.

What is claimed is:

1. An inclination sensor for determining an inclination of an object with respect to a reference vector of a reference coordinate system, the inclination sensor comprising:
   a tilt detector for determining gravity vector data of a local gravity vector;
   a position determination device for determining a position of the tilt detector and generating position data corresponding to the position of the tilt detector; and
   a calculation unit comprising:
      means for providing, based on the position data, position-related vertical deflection data, the vertical deflection data comprising information about a relation between the local gravity vector and the reference vector, and
      calculation means for calculating reference vector data based on the vertical deflection data and on the gravity vector data,
   wherein an inclination of the object with respect to the reference vector is derivable from the reference vector data.

2. The inclination sensor according to claim 1, wherein:
   the means for providing position-related vertical deflection data comprise:
      storing means that are adapted for storing a set of position-related vertical deflection data and for providing position-related vertical deflection data out of the stored set according to the position data, and/or
      communication means for establishing a data connection with a remote server, sending position data to the remote server and receiving position-related vertical deflection data from a data base of the remote server,
   wherein the calculation unit is adapted for at least one of:
      selection of position-related vertical deflection data for a determined position, and
      deduction of vertical deflection data for a determined position, the deduction being based on vertical deflection data related to at least two distinct positions.

3. The inclination sensor according to claim 1, wherein:
   the gravity vector data comprises a tilt of the object with respect to the local gravity vector.

4. The inclination sensor according to claim 1, wherein:
   the vertical deflection data comprises an angle (a) between the local gravity vector and the reference vector and/or a value of the local gravitational acceleration.

5. The inclination sensor according to claim 1, wherein:
   the position determination device comprises receiver means and the position determining device is adapted for at least one of the following:
      use with a GNSS system;
      receiving signals from satellites and/or radio masts;

detecting the position of the tilt detector by means of triangulation radiolocation, deducing position information from a signal of local wireless communication network;

determining a position of the tilt detector at least with a 50% circular error probability of less than 50 meters, and generating position data and providing the position data to the calculation unit.

6. The inclination sensor according to claim 5, wherein:
determining a position of the tilt detector at least with a 50% circular error probability of less than 50 meters comprises determining a position of the tilt detector at least with a 50% circular error probability of less than 20 meters.

7. The inclination sensor according to claim 5, wherein:
deducing position information from a signal of local wireless communication network comprises deducing position information from a signal of a WLAN.

8. A surveying system for measuring distances and/or spatial coordinates, comprising the inclination sensor according to claim 1 and at least one of following:
a survey pole;
a geodetic surveying device;
a self-levelling laser measurement device; and
a hand-held probe or a machine control sensor for use with a laser tracker.

9. The surveying system according to claim 8, wherein the self-leveling laser measurement device comprises at least one of a point laser, a line laser, a grade laser, and a pipe laser.

10. The surveying system according to claim 8, wherein the geodetic surveying device comprises a total station or a theodolite.

11. The surveying system according to claim 8, wherein the survey pole comprises:
a rigid, rod-shaped body having a pointed tip for contacting a measuring point on the ground, the body defining a pole axis;
retro-reflector means, being positioned on the body at a known position relative to the tip;
a tilt detector for detecting a tilt of the pole axis with respect to a local gravity vector; and
a position determination device for determining a position of the survey pole,
wherein the survey pole comprises a calculation unit for:
providing position-related vertical deflection data according to the determined position of the survey pole, the position-related vertical deflection data comprising information about the direction of the local gravity vector relative to a reference vector of a reference coordinate system, and
calculating reference vector data based on the detected tilt of the pole axis with respect to the direction of the local gravity vector and on the position-related vertical deflection data,
wherein an inclination of the pole axis with respect to the reference vector is derivable from the reference vector data.

12. The surveying system according to claim 8, comprising a geodetic surveying device and a survey pole, the geodetic surveying device being adapted to detect a distance and direction to the survey pole, the survey pole comprising:
a rigid, rod-shaped body having a pointed tip for contacting a measuring point on the ground, the body defining a pole axis,
retro-reflector means, wherein the retro-reflector means are positioned on the body at a known position relative to the tip and
a tilt detector for detecting a tilt of the pole axis with respect to a local gravity vector,
the geodetic surveying device comprising:
a base defining a vertical axis,
a support tiltable around the vertical axis,
a telescope unit tiltable around the vertical axis and around a horizontal axis that is orthogonal to the vertical axis and comprising means for distance measurement,
angle determination means for detecting an orientation of the telescope unit with respect to the base and
a position determination device for detecting a position of the geodetic surveying device and for generating position data corresponding to the position of the geodetic surveying device, wherein:
a calculation unit for:
deducing a position of the survey pole from the position of the geodetic surveying device and the distance and direction to the survey pole,
providing position-related vertical deflection data according to the position of the survey pole, the vertical deflection data comprising information about a relation between the local gravity vector and a reference vector of a reference coordinate system, and
calculating reference vector data based on the detected tilt of the pole axis with respect to the direction of the local gravity vector and on the vertical deflection data,
wherein an inclination of the pole axis with respect to the reference vector is derivable from the reference vector data.

13. The surveying system according to claim 8, wherein:
the survey pole and the geodetic surveying device are connected by means of wireless data transfer means,
wherein gravity vector data of a local gravity vector is determinable by the tilt detector and transferable via the wireless data transfer means to the calculation unit.

14. The surveying system according to claim 13, wherein:
the data transfer means comprises at least one of a Bluetooth connection, a wireless local area network, a radio link, and an infrared connection.

15. A method for determining an inclination of an object with respect to a reference vector of a reference coordinate system, the method comprising:
determining a tilt of the object with respect to a local gravity vector;
determining a position of the object;
providing gravity vector data based on the determined tilt and position-related vertical deflection data for the determined position, the vertical deflection data comprising information about a relation between the local gravity vector and the reference vector;
calculating reference vector data based on the gravity vector data and on the vertical deflection data, and
deriving an inclination of the object with respect to the reference vector from the reference vector data.

16. The method according to claim 15, further comprising:
displaying the inclination of the object with respect to the reference vector to a user.

17. The method according to claim 15, further comprising:

transmitting the reference vector data and/or the inclination of the object with respect to the reference vector to an external measurement device for determining a position of the object with respect to the reference coordinate system.

18. The method according to claim 15, wherein:
continuously determining a tilt of the object with respect to a local gravity vector,
continuously providing gravity vector data based on the determined tilt, and
continuously calculating reference vector data based on the gravity vector data and on the vertical deflection data.

19. The method according to claim 15, wherein:
determining the position of the object comprises at least one of:
    determining a position of a reference object having means for determining a distance and direction to the object, wherein the reference object is a geodetic surveying device;
    selecting, based on the position data, vertical deflection data for the determined position of the object out of a stored set of position-related vertical deflection data; and
    deducing, based on the position data and on vertical deflection data related to at least two distinct positions, vertical deflection data for the determined position of the object.

20. The method according to claim 15, wherein providing position-related vertical deflection data comprises:
    establishing a data connection with a remote server, sending position data to the remote server and receiving position-related vertical deflection data from a data base of the remote server.

21. A non-transitory computer program product, comprising program code which is stored on a machine-readable medium comprising a program code segment, having computer-executable instructions for performing the method of claim 15.

* * * * *